United States Patent [19]

Summers

[11] Patent Number: 4,696,315
[45] Date of Patent: Sep. 29, 1987

[54] HERBAL SNUFF COMPOSITION

[75] Inventor: John K. Summers, Anderson, Ind.

[73] Assignee: Better Life International, Inc., Stuart, Fla.

[21] Appl. No.: 777,614

[22] Filed: Sep. 19, 1985

[51] Int. Cl.[4] .................. A24B 15/18; A24D 1/18
[52] U.S. Cl. .................................. 131/359; 131/369
[58] Field of Search ............................. 131/359, 369

[56] References Cited

U.S. PATENT DOCUMENTS

| 92,497 | 7/1860 | Webster. |
|---|---|---|
| 107,693 | 9/1879 | Kilbourn. |
| 111,711 | 2/1871 | Wright. |
| 160,138 | 2/1875 | Appleby. |
| 166,155 | 7/1875 | Sterry. |
| 210,538 | 12/1878 | James. |
| 448,925 | 3/1891 | Miller. |
| 2,298,532 | 10/1942 | Franich. |
| 3,067,068 | 12/1962 | Finberg. |
| 3,747,607 | 7/1973 | Kim .................................. 131/359 |

FOREIGN PATENT DOCUMENTS 842 of 1776 United Kingdom.
2427 of 1859 United Kingdom.
981137 1/1965 United Kingdom.

OTHER PUBLICATIONS

"Herbal Smoking Substitutes for Tobacco," pp. 141–150, year and author unknown.

Primary Examiner—V. Millin
Attorney, Agent, or Firm—Hoffmann, Dilworth, Barrese & Baron

[57] ABSTRACT

The present invention includes tobaccoless chewing and snuff compositions which can include a red clover herb along with other desirable nicotine-free herbs such as dandelion, slippery elm bark, and an effective amount of the casing material for maintaining the composition in a moist coherent state in the mouth during chewing and/or residence time in the oral cavity. The casing material can include different ingredients such as molasses, sea salt, gingers, cayenne, and other ingredients which have desirable properties. The herbs and casing material impart the same texture, taste, bite, life and enjoyment as fine quality chewing tobacco and/or snuff and leafy chews including dandelion as an essential component thereof.

33 Claims, No Drawings

HERBAL SNUFF COMPOSITION

FIELD OF INVENTION

This invention relates to a simulated tobacco snuff and chew compositions including various known herbs of which red clover (*Trifolium pratense*) is the dominate or essential herb thereof and natural leaves, respectively, of which dandelion leaves is the essential component thereof.

BACKGROUND OF THE INVENTION

The Surgeon General of the United States has determined that tobacco is dangerous to ones physical health. The tobacco industry has made diligent efforts to minimize this danger by decreasing the deleterious nicotine in the tobacco.

This danger, though, has been recognized as inadequate as evidenced by the patents to Finberg, U.S. Pat. Nos. 2,930,720 and 3,007,068 which are directed to nicotine or substantially free nicotine smoking and snuff compositions, respectively, which include as essential components, non-tobacco leaves, namely, papaya leaves.

Other prior art patents concerned with the nicotene problem includes U.S. Pat. Nos. 3,112,754 and 3,323,524 and British Pat. No. 842 granted in A.D. 1766.

Other patents disclosing certain features of the invention more specifically discussed below, but not the invention as claimed, are cited for compliance with 37 C.F.R. 1.56.

U.S. Pat. Nos. 160,138 and 3,112,754 and British Pat. No. 2,427 of A.D. 1859.

SUMMARY OF THE INVENTION

An object of the invention is in a snuff or chew herbal tobaccoless snuff composition including red clover as the essential ingredient and to a tobaccoless leafy chew composition including dandelion leaves as the essential ingredient thereof.

It is another object of the invention to formulate a herbal snuff composition including red clover and a leafy chew including dandelion leaves, both including a small amount of tobacco wherein the red clover is the major ingredient thereof of the snuff composition and wherein dandelion leaves are the major ingredient of the leafy chew.

It is still another object of the invention to form a red clover herbal snuff and dandelion chew compositions free of artificial chemicals and exhibiting the same texture, taste, bite and lift as fine-quality tobacco snuff and chew but yet is nonirritating.

It is yet still another object of the invention to compound compositions which do not necessitate expectorating.

Still another object of the invention is in compositions including a preservative and a herb aiding salivation.

Yet another object of the invention is in a red clover and dandelion compositions including at least one of a flavoring, binder and humectant material.

Yet still another object of the invention is in a red clover and dandelion compositions including plant fibers which substantially exhibit the same desirable properties as commercially available tobacco snuff compositions.

Still other objects of the invention will be readily apparent to those skilled in the snuff art in light of the following detailed description of the invention.

DETAILED DESCRIPTION OF THE INVENTION

I. Herbal Chew Composition

One embodiment of present invention is directed to a tobacco-free or substantially tobacco-free herbal snuff compositions including a blend of different herbs and a blend of different "casing" materials. The term "casing" as used herein is of the same scope as disclosed in U.S. Pat. No. 3,067,068 which patent is herein included by reference thereto.

The herbs in the herbal blend, all being commercially available, are as follows:

A. Red Clover (*Trifolium pratense*)

Red Clover is essentially the flower, the flower being beneficial in cleansing the digestive system when the snuff is swallowed. Commercial red clover normally includes a few leaves which gives no adverse side reaction.

Red Clover is harvested by cutting the plant a few inches from the top and drying the cuttings under ambient conditions. The dried material is then sifted by a gravitational separator for reseparating the stems and florets, the florets separated are ground to a fine power. Red clover may be added either as a powder or a fluoret, also known as red clover, cut and sifted (C/S). The red clover C/S is included in the composition in an amount ranging from 40–55%, 46% being preferred in regular cut. The powdered red clover is added in an amount ranging from 20–35%, 27% being preferred in regular cut.

The red clover is a blood purifier and mild alternative property. It includes vitamin B-complex, vitamins C, F and P and is valued for high mineral content, being rich in magnesium, calcium, and copper.

B. Dandelion RT (*Taraxacum officinalis*)

The part of the dandelion utilized herein is the root thereof which is roasted and then ground to a fine powder. The root aids in preserving the herbal snuff composition. It is also known as a source of vitamins A, B1, C and G. Dandelion RT may be included in the composition in a range from 0.05% to 0.07%, 0.05% being preferred, the percent base upon dry ingredients.

Dandelion RT also includes vitamin E, and is rich in calcium, potassium, and sodium. It contains minute amounts of phosphorus, iron, nickel, cobalt, tin, copper and zinc.

C. Echinacea (*Echinacea angustifolia*)

The granulated root of the echinacea plant is the part of the plant utilized in the composition for preventing molding and thus preserving the composition against formation of bacteria known as salmonella. It, also, can be employed both internally and externally as a medicinal preparation. Echinacea is included in a range of 0.02% to 0.04% of dry ingredients, 0.03% being preferred.

Echinacea is a blood purifier and a natural antiobiotic. It contains vitamins A, E and C plus iron, iodine, copper, sulphur and potassium, It is considered to help removed toxins from the blood.

D. Slippery Elm (*Ulmus fulva*)

The inner bark of the slippery elm ground to a light, greyish fawn-colored powder is the part of the plant constituting an ingredient of the snuff composition and is known to be as fully nutritious as oatmeal. Slippery Elm is utilized in a range from about 0.01% to 0.02% of dry ingredients, 0.01% being preferred.

Slippery Elm is very dimulcent, emollient, and nutritive. It is very mucillaginous, making it advantageous to maintain the consistency of the chew. It contains vitamins E, F, K and P, along with several minerals. It helps assist the activity of the adrenal glands and boosts the output of certain hormone which helps send a stream of blood building substances throughout the system.

All of the selected herbs utilized herein in the formation of the herbal snuff composition are certified by the Federal Drug Administration as safe and free of molds and acceptable for marketability.

Principal Casing Ingredients

The casing materials preferably include:

1. Sea Salt as an extremely fine ground functions as a preservative and for inducing salivation is utilized in a range of from up to 0.05-0.09% of dry ingredients with 0.08% being preferred.

2. Jamaican ginger (*Zingiberis officinale*) derived from the root of the plant in powdered form functions to improve the bite of the herbal snuff and is employed in amounts ranging from 0.01-0.04% of dry ingredients with 0.02% being preferred. Ginger contains vitamins A, C and B-complex with several minerals and is good for the respiratory system. The ginger may also be Chinese ginger.

3. Rose hips (*Rosa species*) in powdered form imparting an outstanding flavor to the snuff. Rose hips is included in a range of from 0.01-0.04% of dry ingredients with 0.02% being preferred.

4. Cayenne (*Capsicum frutescens*) in the powdered state for imparting a bite or fiery sensation in the mouth which continues for a long time. Cayenne is included in a range of 0.01-0.05% of dry ingredients with 0.03% being preferred. Cayenne increases the power of all other herbs, acting as a catalyst to carry them into the body. It contains vitamins A, C, iron and calcium with some trace minerals and is rich in potassium. Cayenne has different BTU ratings. In the blend, 40,000 BTU is considered preferrable.

5. Molasses and unsulfurized molasses is essentially a binder and also functions for preventing drying out of the herbal composition and for imparting flavor thereto. Blackstrap makes up 0.70-0.75% of moist ingredients, with 0.71% preferrable. Barbados unsulfured molasses makes up 0.20-0.26% of moist ingredients, with 0.24% preferrable.

6. Various mint oils in a range of about 2 to 6 drops per 22 grams wt. dry mix. It imparts a strong and aromatic aroma and fragrance to the herbal snuff compositions and also imparts flavoring thereto. Examples of mint oils are spearmint (*Mentha spicata*), wintergreen, peppermint (*Mentha piperita*), and clove.

7. Distilled water in a range amount to aid in blending the herbs and casing.

Ancillary Casing Ingredients

Ancillary casing ingredients in addition to the principal casing ingredients may be included in the herbal snuff or chewing composition as follows:

(a) fruit flavors, which also impart varying coloring, as disclosed in U.S. Pat. No. 3,112,754 herein incorporated by reference thereto, particularly honey, vanillin, mints, other than above mentioned, e.g. mountain mint and stone mint, and essential oils, (b) gums, in an amount 0.005-0.009% dry ingredients according to the blend, such as gum tragacanth, gum arabic, gum acacia, and gum karaya, in an amount ??

(c) roots, such as marshmallow root, (d) vegetable leaves, in variable amount according to the consistency, blend and desired end product, especially beet (Patchouli), mullein (*Verbascum thapsus*), white (*Trifolium repeus*) and sweet clover (*Melilotus officinalis*), papaya (*Carica papaya*), red raspberry (*Rubus idaeus*), plantain (*Plantago major*), licorice (*Glycyrrhiza glabra*), ginseng (*Parrax shin-seng* or *Parrax quinquefolium*), anise, licorice, and clove (*Caryophyelus aromaticus*), (e) bactericides, for example, phostoxine which is an FDA approved spray material.

(f) clove powder (*Eugenia caryophyllata*) is included as it is an essential part of the product combination. It contains one of the most powerful germicidal agents known in herbs (Eugenol) and is compared favorably as being more powerful than mercury bichlorida. It is therefore useful in the preservation of the product. Other qualities contribute to the taste and bite found in the product 0.01-0.02% of the dry ingredients with 0.01% preferred.

The casing material is used in varying amounts as a means of binding the mixture together; providing the desired amount of moisture; imparting certain beneficial digestive qualities; and in imparting the particular desired flavor of the product.

Certain other ingredients such as niacin, rutin, and other additional bioflavonoids may be incorporated into the composition of the material. To enhance the nutritional value and quality of the product. These ingredients along with others in the product, induce the production of saliva, and are absorbed quickly and directly through the mucous membranes in the mouth; from thence into the human circulatory system, and eventually to be utilized in a beneficial manner in the body.

These ingredients such as niacin and rutin may be incorporated in the composition by adding to the casing materials niacin (Nicotinic Acid) is not to be confused with the nicotine in tobacco. It, along with rutin may be absorbed by the soft tissue in the mouth, and ultimately, the human circulatory system. The absorbed niacin causes a dialation of the blood vessels with the resultant relaxing of tension and production of a satisfied feeling. Any of these additional items used would make up only a minute percent by weight of the final product.

The casing material may be used in higher concentrations in certain of the products; namely processing of leafy chews.

PROCESS OF TREATING LEAVES AND ROOTS

The processing of leaves and roots of the various plants, various conventional drying techniques such as are used in tobacco drying and curing, are followed. Leaves are dried and cured over various lengths of time. The color of these leaves is approximately that of tobacco. The drying/dehydration process may be done with an artificial low-heat process or dried/cured naturally.

Certain of the leaves may go through an induced or natural sweating, fermenting and aging under conventional tobacco methods and conditions.

THE CUTTING/SHREDDING/POWDERING OPERATION

All flowers/leaves/dried roots go through different and varying methods of preparing the proper consistency and content for the product.

Through special sifting and cutting methods, the undesirable parts of the plant are discarded such as coarse stems, veins, etc. These various processes may be carried out or eliminated as desired, or as called for in the preparation of the raw material for the particular product application.

Part of the process is in the mixing together in the proper proportions, the various leaves in each particular product. In the snuff/chew mixture, the leaves/roots make up approximately 40% of the total weight of the mixture. The remaining weight is found in the oils/extracts/liquids used.

The materials may be mixed together, heated, and compressed then into a suitable plug-type or twist chewing product, or soft-shredded chew material.

In processing the leafy form of chew, leaves may be submerged in vats, for varying lengths of time; suspended in certain of the liquid materials for purposes of flavor/curing properties.

Other ingredients such as moisturizers/glycerine, and humectants may be utilized prior to, and during this process.

FINAL PROCESSING/PACKAGING PREP

The final processing preparation must be done carefully to insure the kind of consistency/flavor and bite essential to a fine product.

Step 1: This step concerns the blending of certain of the powdered ingredients prior to bulk blending. The process for the manufacture of the finished composition begins with the mixing and blending of certain demulcent/mucilaginous/flavoring herbs in their dry powdered form; namely the powdered herbs in the SMC formula, or any additional herbs incorporated into an alternative flavor/consistency formula or combination. These are mixed in a sealed, stainless steel tumble blender for a minimum of fifteen minutes.

Step 2: The product base ingredients, or major dry ingredients are introduced into a large stainless steel blender in preparation for the blending process. All dry ingredients are subjected to powerful magnetic cleaning rolls to ensure that no inert metals go into the finished product. This process is taken care of as the dry ingredients are argued into the blending unit. The concentrate blend described in Step 1 is then spread over the surface of this base and major ingredient and blended for ten to fifteen minutes.

Step 3: The casing ingredients, or liquid ingredients are mixed and blended at high speed for five minutes in a special blender. They are then sprayed directly on the upper surface of the dry ingredients by using special pressure equipment. All the binder/casing ingredients, which also serve the purpose of flavoring/preservation/bite and nutritive qualities, are all used for that particular blend. This usually requires thirty to forty minutes of time. Thorough mixing is essential, but careful controls must be maintained to prevent any balling or caking of the ingredients.

Step 4: The completed blend is then emptied into containers. The material is fed through a specially built stainless steel chopper/beater which ensures proper granulation and consistency of the product.

The completed product is sealed for a storage/curing time of at least seventy-two hours before beginning the packing process. Certain blends must be held longer for more thorough curing and aging. During this time of aging, the casing materials homogenize themselves into the dry ingredients to a proper consistency for packaging. The mix is kept in carefully controlled humidity and in cool temperatures at all times during the processing.

Product preparation may also include certain regrinding/chopping procedures in preparing either the snuff or chewing tobacco compositions.

While the emphasis above is for preparing a tobaccoless herbal snuff and chew composition, negligible amounts of tobacco containing leaves may be included in the tobaccoless herbal snuff and chew composition with miniscule adverse affects on the quality of the tobaccoless herbal snuff exhibiting the properties herein described and a product with mild but satisfying nicotine content.

| 1. EXAMPLES OF HERBAL COMPOSITION | |
|---|---|
| Herbs | grams |
| Red Clover | 10 |
| Dandelion | 1.3 |
| Echinacia | 0.6 |
| Slippery Elm Bark | 0.2 |
| Casing | |
| Sea Salt | 1.3 |
| Jamacian Ginger | 0.7 |
| Rose hips | 0.4 |
| Cayenne | 1.2 |
| Molasses | 15.0 |
| Unsulfurized Molasses | 0.5 |
| Distilled water | 1.0 |
| Mint Oils | Drops |
| Spearmint | 1.0 |
| Wintergreen | 1.0 |
| Clove | 1.0 |

This composition (I) in the opinion of a sampling of the composition exhibited superior results compared to other compositions below.

2. A snuff composition was prepared combining all of the ingredients and in the same amounts as in Example I, but excluding rose hips, slippery elm, spearmint and clove and yet obtained a blend exhibiting good results by panel sampling the resulting blend.

3. Favorable results are still obtained by exclusion of one of Jamacian ginger or cayenne from Example II and substituting spearmint for wintergreen.

| 4. SMOKEY MOUNTAIN REGULAR CUT CHEW COMPOSITION FORMULA | |
|---|---|
| INGREDIENT LIST | PERCENT OF WEIGHT |
| Red Clover C/S | .46 |
| Red Clover Pwd. | .27 |
| Sea Salt E.F. | .06 |
| Dandelion Rt. Rst. | .05 |
| Ginger Rt. Pwd. | .03 |
| Echinacea Augustifolia | .03 |
| Rose Hips Pwd. | .02 |
| Marshmallow Rt. | .01 |
| Slippery Elm | .01 |
| Clove Powder | .01 |
| Cayenne | .05 |
| CASING/FLAVORING MATERIALS | |
| Blackstrap Molasses | .71 |
| Barbedos Unsulf. Mol. | .24 |
| Distilled Water | .05 |
| Spearmint Oil | - |

4. SMOKEY MOUNTAIN REGULAR CUT CHEW COMPOSITION FORMULA -continued

| INGREDIENT LIST | PERCENT OF WEIGHT |
|---|---|
| Wintergreen Oil | |
| Clove Oil | |

(Oils contribute an insignificant percent of weight)

5. Smokey Mountain Wintergreen formula

This formula/combination is essentially the same as IV with the exception of added wintergreen oil as flavoring. The same is true of other flavored blends utilizing fruit flavors.

Ancillary casing ingredients may be added to the blend in the range proportionate to the particular consistency/content/product being produced.

In the utilization of water insoluble plant and oil extracts molasses (water soluble) and the ingredients must be homogenized together by a high speed blending machine. The liquids are sprayed under optimum pressure by use of gas cylinders to properly dispense the liquid into the dry mix. This is specially constructed equipment one-of-a-kind.

This chewing composition includes leaves of dandelion, papaya, sorrel, sunflower, calendula, nasturshium and mallow which are subjected to conventional processing conditions including aging, curing, drying, and pressing in processing for use under conditions similar to those utilized for tobacco leaves by drying in the whole form utilizing natural aging and curing by air currents and artificial heat and other suitable conventional means and by sweating and fermentation under suitable conventional tobacco processing conditions for fully developing the desirable properties of the vegetable materials. The processed/dried leaves and/or fibres are then stored until ready for conversion into the final utilitarian form.

The processed leaves in the chewing composition constitute at least 65% to 75% of the total product weight excluding casing and moistening ingredients.

The chewing composition is of two basic forms; one without any tobacco/nicotin in it, the other with approximately 4% to 5% tobacco leaves.

This leafy composition contains approximately 0.1 to 2 percent of niacin which produces a "niacin-rush" so-called for the euphoria experience by using it and for decreasing the capillary fragility where present.

Various flavoring agents, sweeteners, dyes, aromatics and humectants are applied to the leaves by special spraying methods. Additional distilled water may be added if necessary to obtain the right consistency and later partially or completely removed as desired. This composition may be formed into plugs by use of heat and pressure, or left in the loose-leaf form.

EXAMPLES OF LEAFY COMPOSITIONS
EXAMPLE #1

| | % of Wgt. |
|---|---|
| Constitutents: | |
| Dandelion leaves | .49% of mixture |
| Papaya leaves | .20% of mixture |
| Sorrel leaves | .05% of mixture |
| Calendula leaves | .05% of mixture |
| Casing Ingredients: | |
| Niacin | .03% of mixture |
| Glycerine | .05% of mixture |
| Chinese Ginger Root Powder | .05% of mixture |
| Clove powder | .05% of mixture |

EXAMPLES OF LEAFY COMPOSITIONS -continued
EXAMPLE #1

| | % of Wgt. |
|---|---|
| Althea Root Powder | .01% of mixture |
| Roasted Dandelion Rt. Pwd. | .02% of mixture |
| Liquid Ingredients: | |
| Blackstrap molasses | .71% of mixture |
| Barbados Unsulfured Molasses | .20% of mixture |
| Water | .09% of mixture |

In Example I, the leaves of the dandelion, and papaya, sorrel, and calendula, are dried and then placed in a special blender and tumbled at low speed. The althea root, and dandelion root powder are then added as a part of the casing mixture. The liquids are blended at high speeds to homogenize them, and then are sprayed by a high pressure sprayer which is an integral part of the blender.

The admixture is then placed in contains for allowing full absorbtion of the liquid ingredients. This time lapse is usually four or five days in length. Examination then shows a product very similar in appearance to tobacco.

EXAMPLE #2

| | % of Weight |
|---|---|
| Constituents: | |
| Dandelion leaves | .65% of mixture |
| Papaya leaves | .12% of mixture |
| The casing materials for the above: | |
| Clove Powder | .02% of mixture |
| Althea Root Pwd. | .01% of mixture |
| Slippery Elm Pwd. | .01% of mixture |
| Roasted Dandelion Rt. Pwd. | .04% of mixture |
| Niacin | .02% of mixture |
| Rutin | .05% of mixture |
| Ginger Root Pwd. | .03% of mixture |
| Cayenne Powder | .05% of mixture |
| Minute flavoring ingredients include: | |
| Clove oil | |
| Vanillin | |
| Essential oils | |

The leaves may be dipped in various commercial mixtures or the shredded leaves may be sprayed with casing mixtures already described above relating to herbal chews. These additive materials enhance the quality, flvaor, and aroma, while at the same time leaving a very low residual and even neligible amount of nitrogen and sulphur compounds, or other essential harmful, or unwanted ingredients.

Shredding, cutting, chopping steps are used as desired, or as called for by the particular product consistency desired.

The amounts of ingredients above disclosed have a tolerance variable of 1% to 2%.

EXAMPLE #3

This composition is prepared in the essentially same manner as set forth in each of the other examples. The processing methods of the leafy herbs are completed in the same manner as aforementioned. In this composition, it is to be noted that a difference in the ingredient listing places the leaf ingredients in one category, with other dry ingredients in another, and the moisteners in still another. As before, the flavoring oils lend no appreciable weight to the product and are not included in percentages of weight.

| Leaf ingredients: | % of Weight |
| --- | --- |
| Dandelion | .76 |
| *Taraxacum Officinale* | |
| Dry powders: | |
| Sea salt extra fine | .06 |
| Cayenne | .04 |
| Dandelion Rt. Roasted | .04 |
| Marshmallow root | .01 |
| Clove bud | .02 |
| *Echinacea Augustifolia* | .02 |
| Kola nut | .02 |
| Slippery Elm | .01 |
| Rose Hips | .01 |
| Ginger | .03 |
| Liquid ingredients: | % of Liq. Weight |
| Blackstrap molasses | .71 |
| Barbados Unsulf. molasses | .24 |
| Water | .0 |
| Essential flavoring oils: | |
| Peppermint oil | |
| Wintergreen oil | |
| Almond oil | |
| Fruit oils | |
| Clove oil | |

In the final processing of this composition, the molasses, water, and flavoring oils are blended with one half of the following casing ingredients:

Marshmallow Root Pwd.
Slipper Elm Powder
Ginger Root Powder
Rose Hips Powder
Kola Nut Powder This blending/homogenizing process is done in a special high speed blender prior to application by high pressure spray equipment.

The resultant mixture, once completed, is then transferred to special containers and sealed for four days to permit a total absorption of the moistening and flavoring ingredients, after which it is then packaged for marketing.

Scientific analysis has shown that every herb contains literally hundreds of biochemical constituents that may have an effect on the body. These constituents lend themselves to certain physiological effects, or properties, and may be classified under many terms to describe their effects, which may be placed in three general categories, which are:

1. Eliminating and detoxifying
2. Maintenance
3. Building and toning

The herbs used in the above composition all fall into one or more of the many terms used to denote effects such as antiseptic, demulcent, diuretics, emollient, stimulants, tonics, rubefacients, sialagogues, hemostatics, and vulneraries.

The specific terms are used only to describe the ways in which herbs are generally used, and do not reflect any healing claims of the above compositions.

In all the compositions, stress tests have confirmed the unique ability of the product to improve with age.

A novel herbal snuff and chew composition being described herein, it is appreciated that changes and modifications may be made without departing from the spirit and scope of the invention as hereinafter claimed.

What I claim is:

1. A chewing and/or snuff composition comprising a red clover herb containing essential oils and an effective amount of a casing material for maintaining said essential oil-containing herb in a moist coherent state.

2. A chewing and snuff composition as recited in claim 1 further including an added natural herb capable of functioning as a preservative.

3. A composition as recited in claim 2 further including an effective amount of a mint leaf in an amount sufficient for imparting a strong and aromatic or fragrance to said composition.

4. A chewing and snuff composition as recited in claim 2 wherein said preservative herb comprises dandelion.

5. A composition as recited in claim 4 further including an effective amount of a mint leaf selected from the group consisting of spearmint, wintergreen and clove and mixtures thereof for imparting a strong and aromatic or fragrance to said composition.

6. A composition as recited in claim 5 further including ancillary casing materials or additives selected from the group consisting of fruit flavors, gums, vegetable leaves, vitamins, and bactericides, and mixtures thereof.

7. A chewing and snuff composition as recited in claim 1 wherein said composition further includes additional natural herbs, at least one being slippery elm bark.

8. A composition as recited in claim 7 further including an effective amount of a mint leaf selected from the group consisting of spearment, wintergreen and clove and mixtures thereof for imparting a strong and aromatic or fragrance to said composition.

9. A chewing and snuff composition as recited in claim 4 including dandelion, wherein said red clover is the major herbal ingredient therein.

10. A composition as recited in claim 9 further including an effective amount of a mint leaf selected from the group consisting of spearmint, wintergreen and clove and mixtures thereof for imparting a strong and aromatic or fragrance to said composition.

11. A chewing and snuff composition as recited in claim 1 wherein the casing material includes a material in an amount capable of inducing salivation.

12. A composition as recited in claim 11 wherein said ingredient is selected from the group consisting of molasses and unsulfurized molasses and mixtures thereof.

13. A chewing and snuff composition as recited in claim 11 wherein said material comprises sea salt further functioning as a preservative.

14. A composition as recited in claim 13 further including an effective amount of a mint leaf selected from the group consisting of spearmint, wintergreen and clove and mixtures thereof for imparting a strong and aromatic or fragrance to said composition.

15. A chewing and snuff composition as recited in claim 1 further including natural substances in an amount sufficient to improve the bite of the herbal snuff.

16. A composition as recited in claim 15 further including an effective amount of a mint leaf in an amount sufficient for imparting a strong and aromatic or fragrance to said composition.

17. A chewing and snuff composition as recited in claim 15 wherein the biting substance is selected from the group consisting of Jamacian ginger, Chinese ginger, and cayenne and mixtures thereof.

18. A composition as recited in claim 17 further including an effective amount of a mint leaf selected from the group consisting of spearmint, wintergreen and clove and mixtures thereof for imparting a strong and aromatic or fragrance to said composition.

19. A chewing and snuff composition as recited in claim 1 further including an ingredient in an amount sufficient to prevent substantial drying out of the composition with concurrent flavoring thereto.

20. A composition as recited in claim 19 wherein said ingredient is selected from the group consisting of molasses and unsulfurized molasses and mixtures thereof.

21. A composition as recited in claim 20 further including an effective amount of a mint leaf selected from the group consisting of spearmint, wintergreen and clove and mixtures thereof for imparting a strong and aromatic or fragrance to said composition.

22. A herbal composition comprising herbs and casing material wherein said herbs comprise:

| | |
|---|---|
| Red Clover | 10 gms. |
| Dandelion | 1.3 gms. |
| Echinacia | 0.6 gms. |
| Slippery Elm Bark | 0.2 gms. |
| and wherein said casing material comprises: | |
| Sea Salt | 1.3 gms. |
| Jamacian Ginger | 0.7 gms. |
| Rose hips | 0.4 gms. |
| Cayenne | 1.2 gms. |
| Molasses | 15.0 gms. |
| Unsulfurized Molasses | 0.5 gms. |
| Distilled water | 1.0 gms. |
| and Mint Oils | |
| Spearmint | 1.0 drops |
| Wintergreen | 1.0 drops |
| Clove | 1.0 drops |

23. A herbal composition as recited in claim 22 wherein the composition therein consists essentially of the recited ingredients.

24. A composition as recited in claim 22 further including an additive selected from the group consisting of fruit flavors, gums, vegetable fibers, vitamins, and bactericides, and mixtures thereof.

25. A snuff composition consisting essentially of a plurality of herbs containing essential oils and casing materials wherein at least one essential oil-containing herb is red clover; said red clover being the major constituent in said composition.

26. A snuff composition as recited in claim 25 wherein the herbs consist essentially of red clover, dandelion, and slippery elm bark.

27. A snuff composition as recited in claim 26 wherein the casing material consists essentially of sea salt, Jamacian ginger and molasses.

28. A chewing composition comprising dandelion leaves and an effective amount of a casing material for maintaining said dandelion in a moist coherent state.

29. A composition as recited in claim 28 further including papaya leaves.

30. A composition as recited in claim 29 wheren said leaves consist essentially of dandelion and papaya leaves.

31. A composition as recited in claim 30 wherein said dandelion leaves constitute the major constituent of the composition.

32. A composition as recited in claim 29 further including a leaf selected from the group of sorrel and calendula leaves and mixtures thereof.

33. A composition as recited in claim 28 wherein said casing material includes a substance selected from the group consisting of niacin, glycerin, Chinese ginger root powder, clove powder, althea root powder and roasted dandelion root powder, and mixtures thereof.

* * * * *

UNITED STATES PATENT AND TRADEMARK OFFICE
CERTIFICATE OF CORRECTION

PATENT NO. : 4,696,315

DATED : September 29, 1987

INVENTOR(S) : John K. Summers

It is certified that error appears in the above-identified patent and that said Letters Patent is hereby corrected as shown below:

Col 3, line 4 "dimulcent" should read --demulcent--

Col 10, line 27, claim 8 "spearment" should read --spearmint--

Signed and Sealed this

Twelfth Day of April, 1988

Attest:

DONALD J. QUIGG

Attesting Officer

Commissioner of Patents and Trademarks